Figure 1:
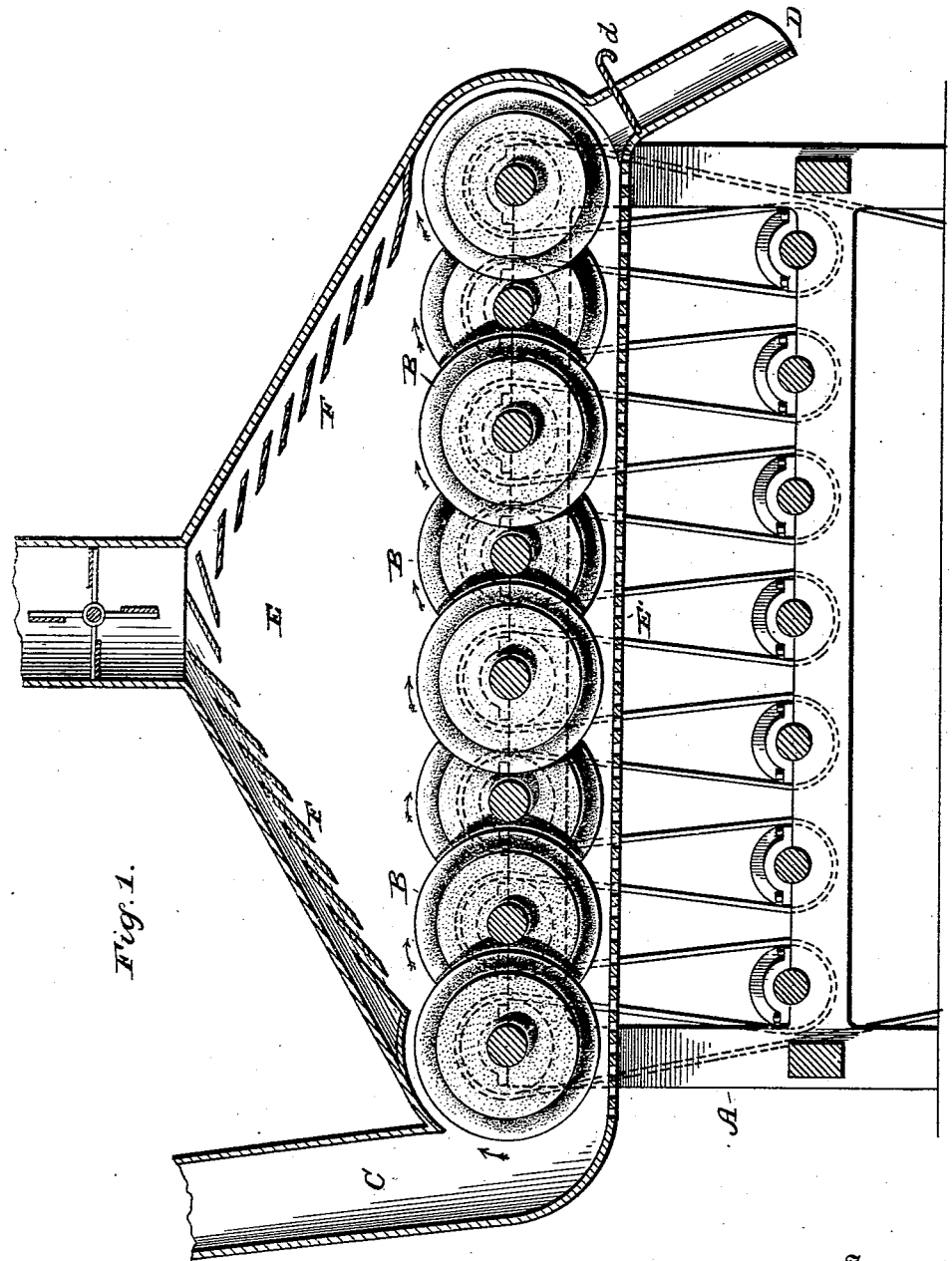

(No Model.) 2 Sheets—Sheet 1.

J. J. FAULKNER.
COTTON SEED DELINTER.

No. 555,312. Patented Feb. 25, 1896.

Witnesses
Victor J. Evans.
Marie Wilson

Inventor
James J. Faulkner.
By E. M. Marble Son
Attorneys

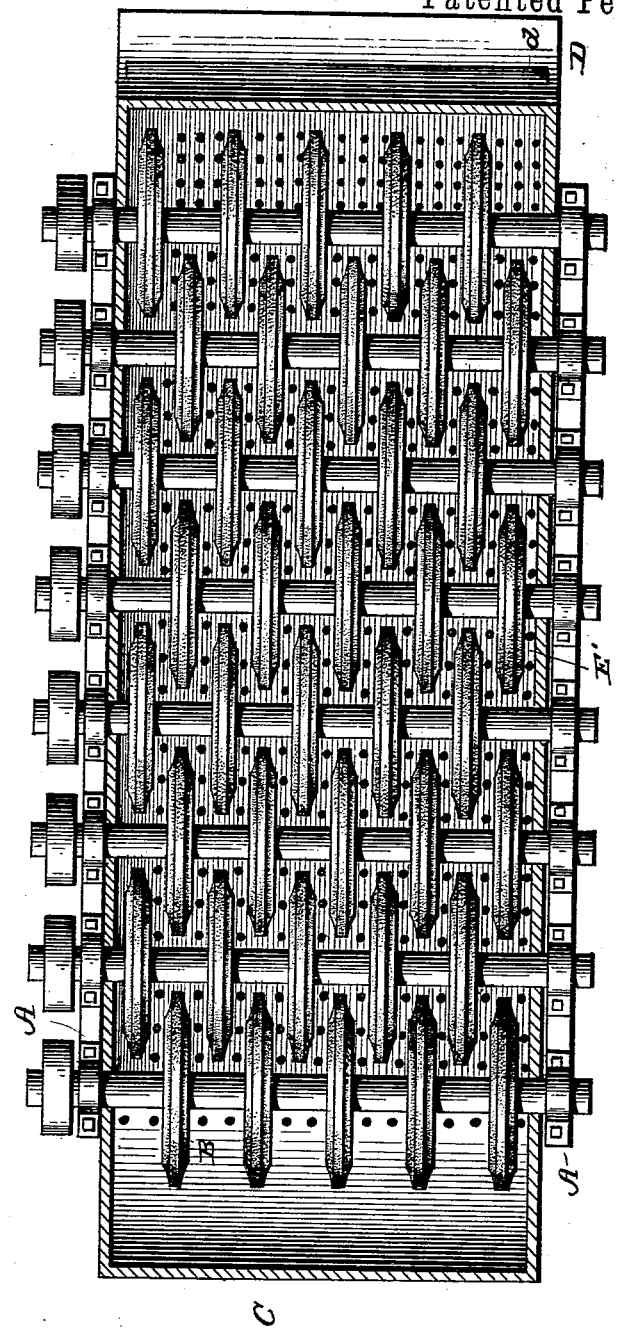

UNITED STATES PATENT OFFICE.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 555,312, dated February 25, 1896.

Application filed July 19, 1895. Serial No. 556,490. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the improved cotton-seed delinter the construction and arrangement of parts of which will be hereinafter fully described and particularly pointed out in the claim.

My present invention belongs to that class of cotton-seed delinters in which the removal of the lint from the seed under treatment is caused by the scouring which the surface of the seed receives between the oppositely-moving abrading-surfaces of a series of intermeshing disks, all of which are caused to rotate in the same direction. Several machines of this class have been constructed and operated, but their capacity has hitherto been limited, owing to the lack of facilities for removing the lint as rapidly as it is separated from the seed. The available abrading-surface in this class of machines is relatively small, and in order that the machines may be built to work satisfactorily especial attention must be given to the lint-removing means.

It is the aim and object of my present invention to provide a cotton-seed delinter of the general type thus stated, in which the means provided for removing the lint from the abrading-surfaces will be so complete and instantaneous in its action as to enable the machine to operate satisfactorily and have a good capacity.

In accomplishing the object of my invention I form a series of groups of abrading-disks by mounting a desired number of the same upon a common shaft, and arranging these groups in line with each other and in such close relation that the disks forming the groups intermesh with each other. The available abrading-surface is practically that portion of the abrading-disks which intermesh with the group of disks next preceding and next following the same, as only at these points are two oppositely-moving abrading-surfaces formed, which are placed close enough together to scour the surface of the seed passing between the same. I therefore place the groups of disks as close together as good construction permits, aiming to secure the greatest amount of active abrading-surface possible.

The feeding of the seed into the machine takes place at one end of the series of abrading-disks through a feed-opening extending across the width of the machine. The discharge of the seed takes place at the opposite end of the series of abrading-disks through a discharge-opening, which also extends across the entire width of the machine. The conveying of the seed through the machine is effected by reason of the fact that the abrading-disks all rotate in the same direction and thus tend to carry the seed lengthwise of the machine.

The removal of the lint from the abrading-surfaces as soon as it is scoured off the surface of the seed under treatment I effect by placing the entire series of abrading-disks in the open mouth of an air-flume in which an exhaust-fan or other suitable mechanism for causing an outward current of air is stationed. The merit in this method of lint-removal lies in the fact that the entire active abrading-surface is constantly brought under the influence of the outward air-current, so that the abrading-surfaces are kept clean and free from lint, thus being in a condition at all times to operate efficiently. The seed under treatment is prevented from falling out of the range of action of the abrading-surfaces by a perforated casing which forms the bottom of the air-flume, and is prevented from being carried up the air-flume along with the lint removed by a series of overlapping inclined plates which guard the mouth of the air-flume.

My invention is fully represented in the drawings which accompany and form a part of this application, in which the same reference-letters refer to the same or corresponding parts, and in which—

Figure 1 is a central section of the entire machine. Fig. 2 is a top plan view thereof, the upper casing being removed.

Referring to the drawings, A represents the machine-frame, in which are supported upon suitable shafts the abrading-disks B. These disks are arranged in groups of three or more, which are mounted upon a single shaft. The various groups are placed in such relation to each other that their surfaces intermesh. The abrading-disks are all actuated so as to move in the same direction, so that the portions of the disks which intermesh with the disks in the next preceding and next following groups are available for the abrading operation. The spacing of the disks upon the shafts is such that the distance between the intermeshing surfaces of two disks is usually about five-eighths of an inch, though it may be more or less. In any case this distance is such as to cause the surface of the seed passing between the same to be thoroughly scoured and freed from lint.

The seed is fed into the machine through a feed-spout C, which is stationed at one end thereof and extends across the entire width of the machine. The discharge of the seed from the machine takes place through the discharge-spout D, which is stationed at the opposite end of the machine and extends across the entire width of the same. The valve $d$ is used to control the discharge in accordance with the condition of the seed under treatment, so that only a finished product will be discharged. The conveying of the seed through the machine is caused by the action of the abrading-surfaces themselves. The abrading-disks all rotate in the same direction, so that they tend to carry the seed lengthwise of the machine, and as the feeding of the seed to the machine is constant the conveying of the seed through the machine is also constant and takes place sufficiently rapidly for the purposes of the delinting operation.

The removal of the lint from the abrading-surfaces is effected by an outward air-current which is caused to exist in the air-flume E, in the open mouth of which the abrading-disks are stationed. The air-current thus has free access to every portion of the abrading-surfaces, and can remove the lint from the same in detail as soon as it is scoured off the surface of the seed. The abrading-surfaces are kept free from lint and are always able to render efficient service.

To prevent the seed from being carried up the air-flume by the force of the exhaust-current, a series of inclined overlapping plates F are used to guard the mouth of the air-flume and prevent any escape of seed. The seed is prevented from falling out of the range of action of the abrading-disks by the perforated bottom E' of the air-flume. The dirt which is present with the seed as it is fed into the machine escapes through the perforations of this bottom, but the perforations are too small to permit the passage of the seed, so that the seed is all conveyed to the discharge-opening.

The operation of my machine is as follows: Seed is fed into the machine through the seed-spout C and is at once subjected to the scouring action of the intermeshing abrading-surfaces, the lint removed being carried upward by the exhaust-air current into the air-flume E, and discharged upon the surface of the condenser or elsewhere. The seed is fed lengthwise of the machine to the discharge-outlet D by the action of the abrading-disks, all of which rotate in the same direction. The dirt is removed from the abrading-surfaces by falling through perforations in the bottom E' of the air-flume, so that this impurity is not permitted to hamper the operation of the machine. The seed, after having its surface entirely freed from lint, is discharged through the discharge-spout D in quantities regulated by its condition.

It is apparent that the arrangement of the abrading-disks may be varied from that shown in the drawings without losing the spirit of my invention, and I do not limit myself to the precise arrangement of the abrading-disks shown in the drawings, nor to the mechanical details represented; but

What I claim as new, and desire to secure by Letters Patent, is—

In a cotton-seed delinter, the combination with an exhaust air-flume, of a series of intermeshing abrading-disks, journaled in said flume, arranged in a continuous line, and means for actuating the same so that they all move in the same direction, seed inlet and discharge openings, means for preventing the seed from falling out of the range of the action of the abrading-surfaces, and a series of overlapping plates for preventing the seed being carried into the flume, substantially as described.

In testimony whereof I affix my signature in presence of two witnesses.

JAMES J. FAULKNER.

Witnesses:
C. L. BERLIN,
J. T. BLAIR.